Nov. 2, 1965 C. J. WAY 3,215,358
DYNAMICALLY LOADED SPINDLE
Filed May 9, 1963
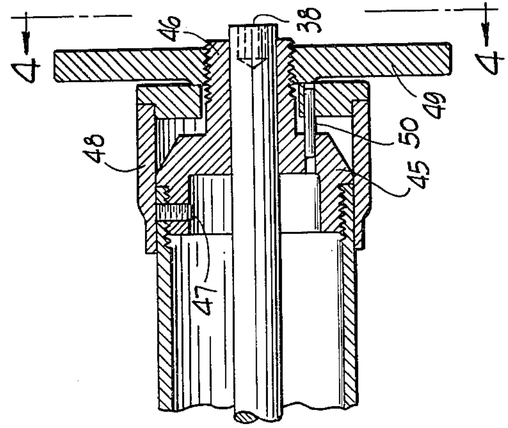
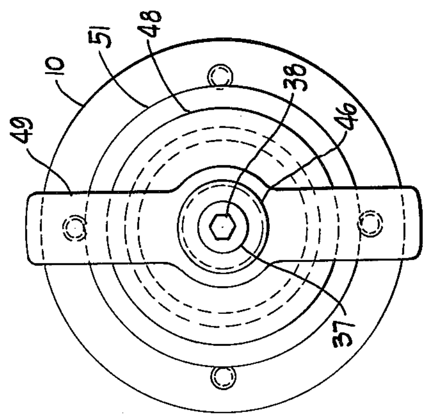
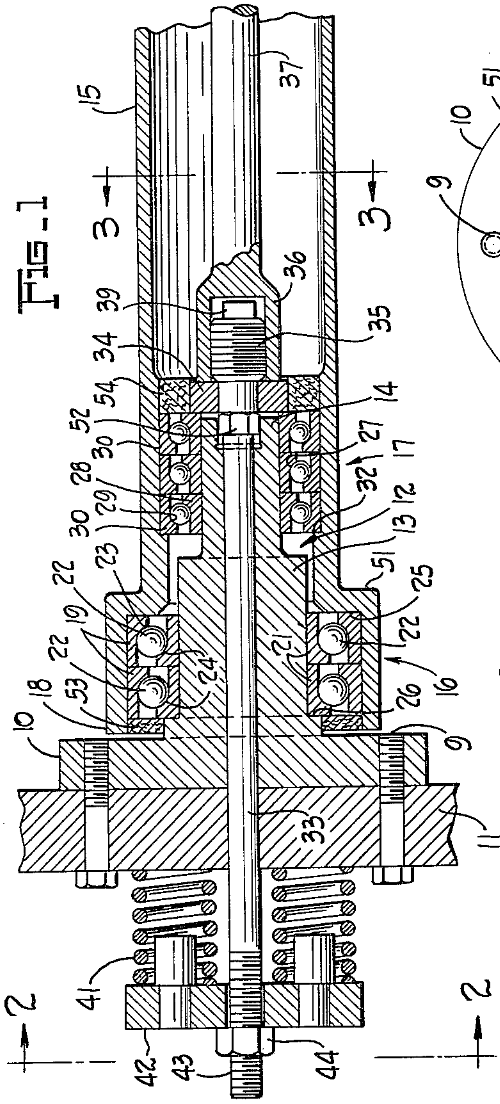
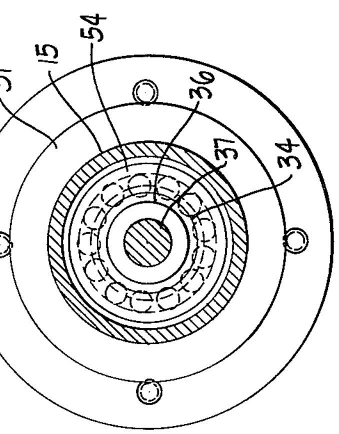
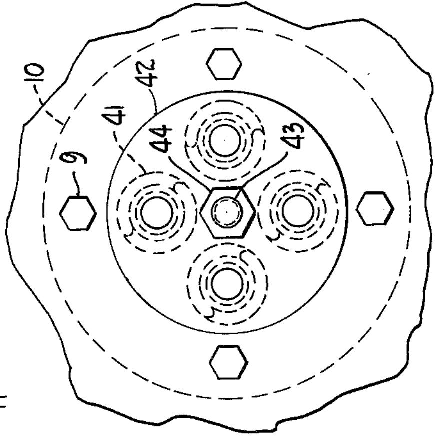
INVENTOR.
CLARENCE J. WAY
BY
Schramm, Kramer & Sturges
ATTORNEYS.

United States Patent Office 3,215,358 Patented Nov. 2, 1965

3,215,358
DYNAMICALLY LOADED SPINDLE

Clarence J. Way, Mansfield, Ohio, assignor to The Ohio Brass Company, Mansfield, Ohio, a corporation of New Jersey Filed May 9, 1963, Ser. No. 279,151
13 Claims. (Cl. 242—68.3)

This invention relates to internal resistance devices and its concerns particularly rotatable mechanisms with constant retarding torque.

An object of the invention is to provide a reel or arbor for carrying a roll of paper or foil being supplied to a winding head. A further object is to provide tension control for an unwinding mechanism by dynamic loading.

Another object of the invention is to provide rotatable mechanism in which retarding torque is controlled by the dynamic loading of ball or roller bearings which also support the rotating mechanism.

A further object of the invention is to provide improved spindle and brake mechanism.

Still another object is to provide a minimum deflection of a reel supported at one end when loaded by the tension and weight of materials. A further object is to avoid any set when an unwinding reel is stopped so as to avoid excessive starting torque.

Still another object of the invention is to prevent dust particles from dropping on material that is being unreeled.

A further object of the invention is to eliminate the requirement for servicing by eliminating shoes, drums, inserts and wearing plates in controlled torque rotating mechanism.

A further object of the invention is to provide a rotatable spindle unit for rollers, pulleys, levers, anti-backlash devices and the like.

Other and further objects, features and advantages of the invention will become apparent as the description proceeds.

In carrying out the invention in accordance with a preferred form thereof, a stationary mounting spindle which is supported at one end by a flange has an opposite end of smaller diameter than the portion of the spindle adjacent the supporting flange. A hollow arbor or reel is provided which is rotatably mounted upon the mounting spindle by means of two sets of angular contact ball or roller bearings. One set of the ball or roller bearings is interposed between the interior of the hollow arbor and the smaller diameter end of the mounting spindle; the other set of ball bearings is mounted between the portion of the mounting spindle adjacent the supporting flange and the interior of the rotatable arbor at the end thereof.

The ball bearings have ball races so arranged that the angular contact of one set of ball bearings opposes the angular contact of the other set of ball bearings. Thrust applied to the inner race of the ball bearings surrounding the smaller diameter portion of the mounting spindle toward the mounting flange dynamically loads the ball bearings and supplies a retarding torque which may be adjusted by adjusting the axial thrust. Preferably a thrust loading bolt is provided which is spring loaded so as to provide axial thrust resiliently.

A better understanding of the invention will be afforded by the following detailed description considered in conjunction with the accompanying drawing in which:

FIG. 1 is a view of a longitudinal section of an embodiment of the invention represented as cut by a plane passing through the axis of an unwinding reel.

FIG. 2 is an end view of the apparatus of FIG. 1 represented as looking in the direction of the arrows 2, 2.

FIG. 3 is a view of a cross section represented as cut by a plane 3—3 as seen looking toward the supported end of the mechanism, and FIG. 4 is an end view of the mechanism of FIG. 1 represented as looking in the direction of the arrows 4—4.

Like reference characters are utilized throughout the drawing to designate like parts.

As illustrated in the drawings the mechanism is assumed to be mounted upon a vertical wall or bracket 11. There is a mounting spindle 12 having a flange 10 bolted to the vertical bracket 11 by a plurality of machine screws or bolts 9. The mounting spindle 12 has a larger diameter portion 13 adjacent the supporting flange 10 and has a reduced diameter at the projecting end 14.

There is an arbor or reel 15 mounted rotatably upon the mounting spindle 12 by means of two sets of ball bearings 16 and 17. As shown the construction is such that the reel 15 may extend or project considerably beyond the projecting reduced diameter end 14 of the mounting spindle 12. The invention is not limited to having the projecting end 14 of the mounting spindle 12 of less diameter than the remaining portion 13, but the construction illustrated facilitates compactness and minimum weight for the desired supporting strength. Where a mounting spindle is employed having two different diameters, as shown herein, the rotatable reel or arbor 15 is also formed with a larger bore and a larger external diameter at the end 18 toward the spindle mounting flange 10.

The ball bearings 16 comprise outer ball races 19 and inner ball races 21 supporting bearing balls 22. The outer ball races 19 are provided with quarter round surfaces 23 on the right hand side of the balls 22 as seen in FIG. 1 and the inner ball races 21 are provided with quarter round surfaces 24 to the left of the balls 22 as seen in FIG. 1 so that the ball bearings 16 are adapted to oppose thrust applied from the outer races 19 against the inner races 21 toward the supporting flange 13 of the mounting spindle 12.

For applying and resisting any such thrust the arbor 15 is formed with an abutment surface 25 contacting the outer ball race 19 and the mounting spindle 12 is formed with an abutment surface 26 contacting the inner ball race 21. Thus the ball bearings 16 are provided with angular contact resisting axial thrust of the arbor 15 toward the spindle supporting flange 10.

The ball bearings 17 likewise are of the angular thrust type but so arranged that the angular contact opposes that of the ball bearings 16 with the quarter round portions 27 of inner ball races 28 to the right instead of to the left and with quarter round portions 29 of outer ball races 30 to the left instead of to the right so that the outer ball races 30 are adapted to resist axial thrust from the inner ball races 28 toward the mounting spindle supporting flange 10. An abutment 32 is formed in the inner surface of the rotatable arbor 15 to resist thrust applied to the outer ball races 30. In order to apply axial thrust to the rotatable arbor 15 toward the mounting spindle supporting flange 10 a thrust loading bolt 33 is provided adapted to draw a thrust washer 34 against the inner ball races 28 of the ball bearing 17.

The thrust loading bolt 33 may have a head bearing directly against the thrust washer 34, but preferably the thrust loading bolt 33 has a head 35 externally threaded to mate with an internally threaded socket 36 which is adapted to bear against the thrust washer 34. In order to enable thrust adjustments to be made from the right hand end of the extending arbor 15 an adjusting shaft 37 is provided in which the enlarged end socket 36 is formed. Preferably the right hand end of the adjusting shaft 37 is provided with an hexagonal socket 38 to receive a conventional socket wrench. To prevent overloading a stop 39 is provided on the end of the thrust loading bolt 33 which engages the bottom of the socket 36 in the adjusting shaft 37. Deflection is substantially eliminated by the strength of the relatively large diameter hollow reel 15.

Preferably the thrust loading bolt 33 is spring loaded bc means of compression coil springs 41 mounted between the upright stationary bracket 11 and a spring plate 42 surrounding a threaded end 43 of the thrust loading bolt 33 carrying an adjusting nut 44.

At the right hand or projecting end of the hollow arbor 15 a threaded plug 45 is provided having an externally threaded nipple 46. There is a headless, socket-type set screw 47 for locking the plug 45 in the end of the arbor 15. For holding a spool on the arbor 15 a ferrule type clamp 48 and a wing nut 49 are provided, the latter being threaded upon the nipple 46. A dowel 50 may be provided for preventing rotation of the ferrule 48.

When the rotatable mechanism shown is employed in an unwinding reel for applying insulating paper or foil in winding insulating tubes, grading capacitors or condenser foils, a spool (not shown) of insulating paper or foil is slipped over the arbor 15 with the clamp 48 and nut 49 removed. The latter are then mounted in place as shown in the drawing so as to hold the spool against the shoulder 51. It will be understood that where the material to be unwound is sufficiently rigid it may be directly mounted in coil form upon the arbor 15.

The adjusting nut 44 may be adjusted to obtain a desired minimum torque for rotating the spindle. The retarding torque may then be increased above this minimum amount by turning the adjusting shaft 37. In this manner a thrust load is applied to the ball bearings 16 and 17 so as to remove any shake between the shaft and housing or the mounting spindle 12 and the arbor 15. This thrust load is increased on the opposed bearings until the housing or spindle resists turning and in so doing acts as a brake. Increasing the thrust increases the braking action.

Under such a thrust load a ball and race will deflect somewhat, causing work to be done, with increasing thrust increasing the work required to be done. In this manner a brake is provided to prevent the reel from turning except when tension is applied to unwind the paper or foil so that the effects of inertia are overcome. The brake provides a convenient means for adjusting the tension of the insulating paper or foil or other material which is to be rewound or applied to other apparatus (not shown). Automatic compensation for change in tension of the material being unreeled is achieved because, as the material is reeled off, the diameter of the roll diminishes increasing the force required to overcome a given retarding torque. This torque also diminishes because of diminishing weight of the roll.

The brake is adapted for automatic or remote control thereof by application of an hydraulic or pneumatic piston or solenoid to the loading bolt 33 or to the spring plate 42.

It will be understood that maximum braking power is proportional to the size or quantity of bearings stacked and the life expected. Although the apparatus has been shown as having a stationary spindle and a rotatable housing or hollow arbor, it will be understood that the invention is not limited thereto and does not exclude the converse arrangement in which there is a stationary housing and rotatable shaft. Rotation of the adjusting nut 44 with adjusting shaft 37 does not rotate the bolt 33. In the arrangement illustrated, rotation of the thrust loading bolt 33 is prevented by forming the end of the bore in the projecting end 14 of the stationary mounting spindle 12 with a hexagonal socket to cooperate with an hexagonal head 52 formed on the bolt 33.

Preferably the ball bearings 16 and 17 are packed with lubricants such as light grease or oil. Oil seals 53 and 54 of suitable materials such as rawhide are provided. Consequently, no grease or oil is free to drop upon materials that are being unreeled from the arbor 15. Likewise no other particle or brake dust is free to drop on the materials since the rotatable supporting mechanism is enclosed by the arbor and the braking mechanism is internal. No servicing is required since there are no shoes, drums, inserts or wearing plates. Moreover, the possibility of noise or chatter such as may come from brake shoes is avoided.

While the invention has been described as embodied in concrete form and as operating in a specific manner in accordance with the provisions of the patent statutes, it should be understood that the invention is not limited thereto, since various modifications will suggest themselves to those skilled in the art without departing from the spirit of the invention.

I claim:

1. An internal resistance rotatable device comprising in combination a mounting spindle having a supported end and a projecting end of reduced diameter, a hollow arbor, a first set of angular contact ball bearings at the supported end of the mounting spindle, a second set of angular contact ball bearings at the reduced diameter end of the mounting spindle, the angular contacts of said sets of ball bearings being opposed to each other, said arbor riding on said ball bearings, and means for applying thrust to said sets of ball bearings for dynamically loading the arbor.

2. A rotatable device comprising in combination a mounting spindle having a supported end, a projecting end and a bearing surface adjacent the supported end, a rotatable hollow arbor, a first set of ball races and ball bearings between the bearing surface portion of the mounting spindle and the arbor, a second set of ball races and ball bearings surrounding the projecting end of the mounting spindle and within the arbor, whereby the arbor is rotatably supported by the mounting spindle, the ball races being formed to provide angular contact with the balls of the ball races, the angular contact of one set of ball races being opposed to the angular contact of the other set, and means for applying axial thrust to the ball bearings for dynamically loading the arbor.

3. A rotatable arbor as in claim 2 wherein an abutment is provided in the arbor for opposing axial movement of the second ball bearings toward the supported end of the mounting spindle, an abutment is provided in the mounting spindle for opposing axial movement of the first ball bearings toward the supported end of the mounting spindle, an abutment is provided in the arbor for transmitting axial thrust of the arbor in the direction toward the supported end of the mounting spindle against the first ball bearings and means are provided for applying axial thrust against the second set of ball bearings toward the supported end of the mounting spindle for transmitting axial thrust through the second set of ball bearings, the arbor and the first set of ball bearings for dynamically loading the arbor.

4. Apparatus as in claim 3 wherein the axial thrust is applied resiliently.

5. Apparatus as in claim 4 wherein the axial thrust is adjustable for adjusting the internal resistance of the arbor.

6. Apparatus as in claim 1 wherein the arbor extends beyond the projecting end of the mounting spindle and an adjusting shaft extends coaxially through the extending portion of the arbor and is provided with an adjustable connection to the thrust applying means.

7. A rotatable device as in claim 1 wherein a thrust loading bolt is provided extending through the mounting spindle with abutment means connected thereto at one end for applying thrust to the second set of ball bearings.

8. A rotatable device as in claim 7 wherein the thrust loading bolt is provided with a second end projecting beyond the supported end of the mounting spindle and thrust loading springs are mounted between the supported end of the mounting spindle and said second end of the thrust loading bolt.

9. Apparatus as in claim 8 wherein the end of the thrust loading bolt projecting through the projecting end of the mounting spindle is threaded externally and an internally threaded collar is provided with means for applying axial thrust to the second ball bearing, which is adjustable in accordance to the relative angular positions of the internally threaded collar and the externally threaded end of the thrust loading bolt.

10. Apparatus as in claim 9 wherein the arbor extends beyond the projected end of the mounting spindle and an adjusting shaft is provided in the extending portion of the arbor coaxial therewith connected at one end to said internally threaded collar whereby thrust adjustment may be made from the end of the said rotatable arbor.

11. Tension control for unwinding mechanism comprising in combination a rotatable arbor as in claim 1 adapted to hold a spool or coil from which strip material is to be unwound and a clamp at the end of the arbor for holding such spool or coil on the arbor.

12. A rotatable device comprising in combination a mounting spindle having a supported end, a projecting end and a bearing surface adjacent the supported end, a rotatable hollow arbor, a first set of ball races and ball bearings between the bearing surface portion of the mounting spindle and the arbor, a second set of ball races and ball bearings surrounding the projecting end of the mounting spindle and within the arbor whereby the arbor is rotatably supported by the mounting spindle, the arbor extending toward the projecting end of the mounting spindle beyond the first set of ball races and an oil seal interposed between said mounting spindle and the inner surface of said arbor between the end thereof and the first set of ball races whereby the rotatable supporting mechanism is fully enclosed.

13. Apparatus as in claim 12 wherein a thrust washer is secured at the projecting end of the mounting spindle retaining the ball races and a second oil seal is mounted within the hollow arbor surounding said thrust washer.

References Cited by the Examiner

UNITED STATES PATENTS 1,641,661 9/27 Colman -------------- 242—68.3

MERVIN STEIN, *Primary Examiner.*